Jan. 6, 1953  E. TOCHILIN ET AL  2,624,846
X-RAY FILM BADGE DOSIMETER
Filed Oct. 13, 1950

INVENTOR.
Eugene Tochilin
Richard H. Davis
BY
Attorneys

Patented Jan. 6, 1953

2,624,846

UNITED STATES PATENT OFFICE 2,624,846

X-RAY FILM BADGE DOSIMETER

Eugene Tochilin, San Francisco, and Richard H. Davis, Albany, Calif.

Application October 13, 1950, Serial No. 190,028

4 Claims. (Cl. 250—83)

(Granted under Title 35, U. S. Code (1952), sec. 266)

This invention relates to a method and apparatus for measuring radiant energy and more particularly to a radiation meter known as an X-ray film badge dosimeter and a method for using the same.

With prior art film badge dosimeters it has been either difficult or impossible to determine accurately and simply the quality and quantity of X-radiation to which the badge has been subjected. By quality is meant the wavelength of monochromatic radiation or, in the case of heterogeneous radiation, the wavelength of monochromatic radiation which would have the same half-value layer as the heterogeneous radiation, or simply the hardness of such radiation. The term "effective kilovoltage" is also used synonymously with the foregoing terms and, being commonly known in this art, will be used in the specification. The effective kilovoltage is not the actual voltage applied to an X-ray tube. By quantity of radiation is meant the amount of radiation or dosage, usually measured in roentgen units.

An object of this invention is to provide a simple method and apparatus, effective over a wide range of X-ray energies, for determining quantitatively the quality and quantity of radiation received by a film.

In general, the photochemical effect of X-rays on film is a function of both the energy or wave length of radiation and the quantity or dosage. The photochemical effect is observed as the density of the film after development, usually under standardized conditions, and the density is the only convenient property of the exposed film usable to determine the characteristics of the radiation which the film has received. Since a given density can be achieved by various combinations of X-ray wavelengths and dosages it is apparent that a single piece of film is insufficient to determine the magnitudes of these two factors. Therefore, two independent exposures yielding two densities which are independent functions of the wavelength and dosage must be used to evaluate the two independent variables. This can be accomplished by using a film badge so constructed as to expose to the same unknown radiation two regions of the same film, one, for example, unshielded and another shielded by a material serving as a wavelength-dependent filter for X-rays.

By judicious selection a film and a shielding material can be chosen such that, over an appreciable range of wave lengths and dosages, (1) the densities of the unshielded and shielded regions lie within readable limits, (2) the ratio of the densities of the two regions uniquely determines the wavelength and (3) this ratio is independent of the dosage. The ratio for each wavelength can be determined simply by exposing an unshielded region and a shielded region of the same film to the same radiation of a particular wavelength, co-developing the two regions under standardized developing conditions and repeating this process for a series of different wavelengths covering a desired range. The density ratios can then be plotted against wavelength or a table made up of density ratios with their corresponding wavelengths or (the equivalent) effective kilovoltages. The wavelength or effective kilovoltage of any unknown radiation can be determined simply by measuring the densities of two regions of the same type of film exposed to the unknown radiation and developed in the same manner as that used to construct the table, calculating the density ratio, and looking up in the table the corresponding wavelength.

Once the wavelength is known, the other variable, the quantity of radiation, can be determined from the following considerations. There are commonly available films which, within the aforementioned appreciable range, exhibit a linear variation of density with amount or dosage of radiation for each wavelength of radiation; that is, the density is, in this range, directly proportional to the dosage for any wavelength, although the constant of proportionality is, of course, different for each wavelength. Mathematically this can be written $D_\lambda = K_\lambda r$ where $D_\lambda$ is the density of the film at any wavelength and $r$ is the dosage, say in roentgen units, received by the film. Conversely, then, the radiation dosage is proportional to the density thus:

$$r = D_\lambda \frac{1}{K_\lambda}$$

and the multiplying factor or constant of proportionality, $$\frac{1}{K_\lambda}$$

can be evaluated by subjecting the film to a measured dosage of 1 roentgen at a known monochromatic wavelength yielding $$\frac{1}{K_\lambda} = \frac{1}{D_\lambda}$$

That is, the factor $$\frac{1}{K_\lambda}$$

is equal to the reciprocal of the density for a dosage of 1 roentgen at each wavelength. A table of multiplying factors, one for each wavelength, can thus be established. If, then, the wavelength is known, the dosage received by a particular film can be computed simply by multiplying the density of the film by the particular factor $$\frac{1}{K_\lambda}$$

associated with that wavelength.

From the foregoing it is apparent that the two sets of interrelations, (1) density ratio and wavelength and (2) wavelength and multiplying factor, can be combined into a single table relating each density ratio with its wavelength and with the multiplying factor corresponding to that wavelength. Then a film badge composed of the same type of film used in preparing the table and having an unshielded region and a shielded region the same as that used in preparing the table can be employed to determine quantitatively the quality and quantity of unknown radiation to which it is exposed by developing the film under the standardized developing conditions, measuring the density of the two regions and from the ratio of these two densities looking up in the table directly the value of the wavelength and its corresponding multiplying factor, and then multiplying the density of the unshielded region of the film by that factor to yield immediately the dosage in roentgens. Furthermore, where the wavelength is not of interest this variable can be eliminated from the chart to form a simplified table.

The readable limits for density of developed film are from about .01 to about 3 on the standard density scale used in this art. Density on this scale is defined as the common logarithm of the reciprocal of the transmission where transmission is the ratio of the light emergent to the light incident of a film. The ratio of densities of the aforedescribed two-region film badge is usable theoretically within the range over which it uniquely determines the wavelength but as a practical matter, for good accuracy, the ratio should not be used in a range where large variations in wavelength correspond to negligible variations in ratio.

In general it has been found to be difficult if not impossible to cover a wide range of wavelengths with a two-region badge. To extend the range, therefore, of the film badge of this invention, additional regions of the film are shielded by shields of progressively increasing opacity to X-rays, care being taken that the materials chosen for the shields meet the requirements of the aforementioned criteria. Preferably the second shield is so chosen that the ratio of densities of the film in the first and second shielded regions is usable from the point at which the usable range of ratios of the unshielded region and the first shielded region ends, or slightly before that point. A similar procedure is observed for each pair of shields and, for simplicity, of the possible shields which are suitable those are chosen which will require the least total number of shields to cover a desired range of wavelengths. It may be noted that the use of a plurality of such shields usually increases, over certain portions of the wavelength range, the maximum dosage for which the badge is usable. Advantage is taken of the fact that such shields filter out a proportionate amount of each wavelength regardless of the total amount of radiation of that wavelength. Thus the densities of the film under each shield vary linearly with the amount of radiation for any one wave length and there will exist therefore a multiplying factor associated with each wavelength for each particular shield. This factor will be equal to the product of some constant by the corresponding factor $$\frac{1}{K_\lambda}$$

for the unshielded film, the constant being determined by the proportion of filtering of the particular shield. Although the foregoing explanation is based on the assumption of monochromatic X-rays the analysis is valid for the effective wavelength or effective kilovoltage of a heterogeneous beam.

A specific embodiment of this invention has been designed to more than adequately cover the range of effective X-ray energies and weekly dosages usually encountered in medical X-ray work. The badge is actually usable between effective kilovoltages of about 17 and 130 and for dosages exceeding 1 roentgen over its entire wavelength range and of as much as 2 roentgens for much of its range. Although this specific embodiment is of particular usefulness and will be described in detail hereinafter it is to be understood that the principles of the invention are applicable generally and can be used to construct badges for use under other conditions. For example, while this embodiment has four differently exposed regions of film others may require more or less than four regions depending on the range to be covered.

Reference is now made to the accompanying drawing wherein

Figure 1:
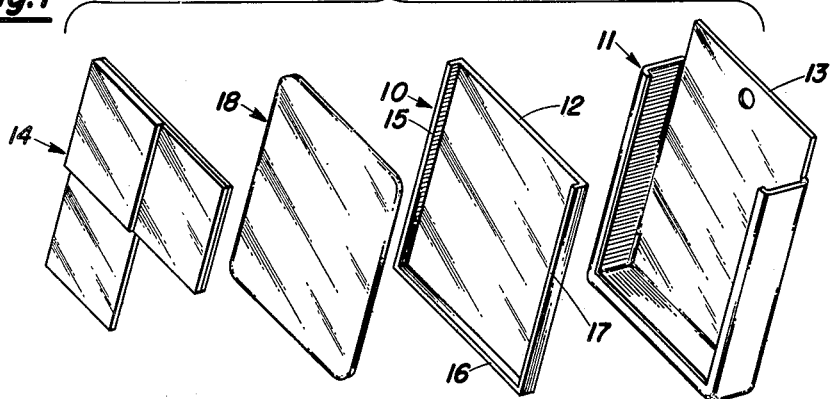
Fig. 1 is an exploded view of the film badge dosimeter of the present invention.
Figure 2:
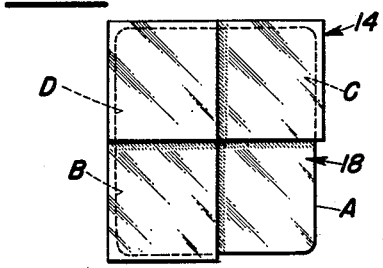
Fig. 2 is an assembly view of the device of Fig. 1.

The film badge dosimeter of this invention includes, as shown in Fig. 1, a film backing 10 preferably of lead about 2 mm. thick which, in assembling the device, is slid into the film badge holder 11 so that the flat side of the backing is placed adjacent the inner surface of the back of the holder and so that the open end 12 of the backing 10 lies adjacent the top end 13 of the holder 11. An echelon type shield 14 is provided which is adapted to be slipped into the holder 11 to lie above the raised edges 15, 16 and 17 of the film backing 10. A light-tight package of X-ray film 18 is provided to be slipped into the space between the front of the film backing 10 and the back of the shield 14. In the assembled view shown in Fig. 2 area A represents an open window or unshielded area of the film. Area B of the film package represents an area of film shielded by a sheet of aluminum about 0.3 mm. to about 0.5 mm. in thickness. Area C represents an area of film shielded by said sheet of aluminum and a sheet of copper about 0.1 mm. to about 0.2 mm. in thickness superimposed on the aluminum. Area D represents an area of film shielded by said sheet of aluminum and a sheet of copper about 0.6 mm. to about 2 mm. in thickness, superimposed upon the aluminum. Commonly available stock that excellently fulfills the shielding requirements is aluminum sheet .020 inch (.508 mm.) thick, copper sheet .008 inch (.203 mm.) thick, and copper sheet .024 inch (.610 mm.) thick. The sheet of aluminum and superimposed sheets of copper can, for convenience in handling, be fastened together by any convenient method such as welding, soldering, or cementing.

During the use of this device it is intended that one shall be issued to each person who may be exposed to dangerous radiation. They would normally be issued and collected at regular time intervals, perhaps once a week, depending upon the expected radiation. Immediately after collection the film should be developed and a record kept of the indicated exposures so that it becomes possible to determine when any individual is being exposed to excessive amounts of radiation.

The method of selecting materials for such a film badge can be viewed in one respect as follows. With the limitation that the film density shall never exceed 3 and with the requirements that the badge be usable over a range of X-ray energies from about 17 to about 130 effective kilovolts and over a range of dosages from about .1 roentgen up to say 1 roentgen, the experience of one skilled in the art would suggest that a single pair of film regions would be insufficient. With the expectation, then, of a plurality of different shielded regions the first step might be the choice of a film. At dosages of 1 roentgen a typical, commonly available X-ray dental film exhibits curves of density versus effective energy similar to that labelled A in Fig. 3 having a peak sensitivity in the neighborhood of 40 effective kilovolts. By sensitivity is meant essentially the photochemical effect or the density after development, usually under conditions close to those recommended by the manufacturer for the particular film, due to a particular amount of radiation. That is, for example, a film which would acquire under standardized developing conditions a density of, say 3 with a radiation dosage of 1 roentgen at an effective kilovoltage of 40 and would acquire a density under the same standardized developing conditions of less than 3 for the same 1 roentgen dose at both higher and lower effective kilovoltages is said to be most sensitive at 40 effective kilovolts. A tentative likely choice would be a film which would yield a density no greater than the readable maximum of 3 at an exposure of 1 roentgen at the peak sensitivity region of about 40 effective kilovolts when developed under convenient standardized developing conditions. The film should preferably also be one of the type that responds linearly to X-ray dosage up to the maximum readable density of 3. It may be noted that some films can also be used which, although suitable in other respects, exhibit linearity to a density of only about 2. Such films can have their linearity extended by increasing the developing time.

Figure 3:
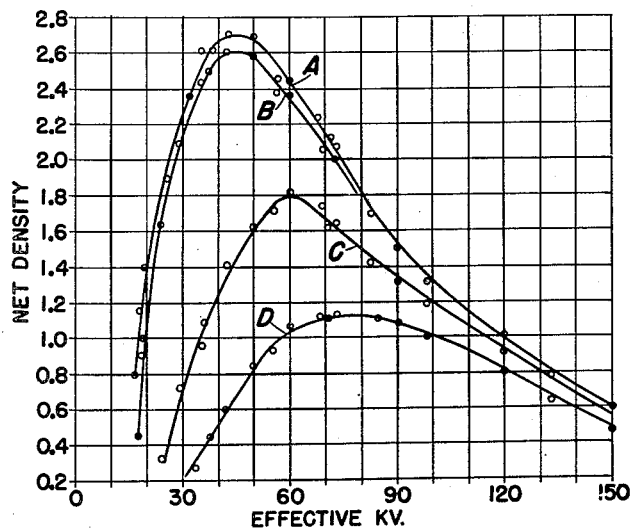
Fig. 3 is a graph showing curves of net density versus effective kilovoltage at 1 roentgen of radiation for each of the 4 areas of the film badge.

Since commonly available shielding materials can be obtained which will produce from the film shielded by them a curve of generally the same shape as curve A in Fig. 3 but merely with a lower peak slightly displaced along the abscissa from the peak of curve A, it is necessary merely to choose for the first shield one of such materials of sufficiently low atomic number and of sufficient thinness that, at the desired lower limit of, say, 17 effective kilovolts, a readable film density will be produced at the lowest dosages which are of concern. With such a shield the density ratio of the unshielded and shielded film regions will possess the desirable properties not only of uniquely determining the effective kilovoltage almost until the peak of the curves is reached but also of varying quite rapidly with effective kilovoltage. This rapid variation of density ratio with kilovoltage makes for increased accuracy and enables distinctions to be made quite readily between various adjacent wavelengths.

Among those films which meet the foregoing requirements are found medium-speed dental film and medium-fine-grain industrial film, for example. It is, of course, desirable that the film used should be sufficiently homogeneous that under uniform radiation the blackening is uniform over the entire film area. Curve A of Fig. 3 was plotted for a typical dental film. A thin sheet of aluminum meets the aforementioned requirements for a shield for the first shielded region and a curve for the film region under such a sheet .020 inch thick appears as curve B in Fig. 3. The aluminum used should preferably be of a high grade of purity to insure reproducibility and predictability of results. Aluminum of at least 99% purity, such as is commercially available, is preferred. With the aforedescribed aluminum shield for the first shielded region the density ratio of the unshielded region and the first shielded region is usable within the range of from about 17.5 effective kilovolts to about 27 effective kilovolts. Below this range small dosages produce unreadable densities and above this range the density ratio changes very slowly and, therefore, the ratios should not be used outside of this range.

To choose the rest of the shields to cover the desired range several desiderata should be considered. The range of each shield should begin approximately where the range of the preceding shield leaves off, or preferably the two ranges should overlap somewhat; the shields should not be too bulky; and, for simplicity, the fewest number of shields necessary to cover a desired range should be used. To avoid bulkiness, in general, means to use a relatively thin sheet of a heavier material rather than a thick slab of a lighter material. Thus in the specific embodiment of this invention the shield for the second range, instead of being, for example, one necessarily thick piece of aluminum, is made up of the combination of a thin sheet of the same aluminum used for the first shield and a thin sheet of copper .003 inch thick. Although, for convenience in assembly, the copper is shown superimposed upon the aluminum this arrangement can be reversed. The copper used should be of relatively high purity. Electrolytic grade copper of over 99% purity has been found to be satisfactory. The curve for the second shielded region under this shield is curve C in Fig. 3. The ratio of the densities of B and C is useful from about 25 effective kilovolts to about 85 effective kilovolts but thereafter changes very slowly.

The curve for the third shielded region, shielded by aluminum of .020 inch thickness and copper of .025 inch thickness appears as curve D in Fig. 3. The ratio of the densities of the C and D regions is satisfactorily usable within the effective energy range from about 35 kilovolts to about 130 kilovolts.

Although aluminum and copper shields of the thicknesses previously mentioned have been found satisfactory for the ranges for which the specific embodiment was intended, other materials including other metals or alloys can be used instead, providing that they have substantially equivalent X-ray absorption characteristics. These characteristics are ascertainable from well known published curves or tables such, for example, as the table of X-ray absorption coefficients appearing in Medical Physics, page 1334, Year Book Publishers Incorporated, 1944. Such data are useful in the theoretical design of a badge to be used for any particular ranges of effective energy and quantities of radiation and are also useful in guiding the initial selection of materials and thicknesses for constructing badges by a trial and error method in which sets of curves are run similar to those in Fig. 3 with a view to choosing those which best meet the requirements. The backing material, although made of lead in the specific embodiment, can also be of different composition provided that it is sufficiently opaque to the X-rays for which the badge is designed so that radiation can reach the film from one side only.

In carrying out the method of this invention it is necessary that proper processing of the exposed films be insured since the actual density read on a film will depend on such factors as time of development, temperature of development, amount of agitation and age and condition of development. The method contemplates the use, for this purpose, of a one-point calibration check which consists of developing, in the developer which is to be used for the film of the film badges, a pre-exposed standard film for various developing times until a net density of 1.5 plus or minus 0.15 is obtained. The choice of a density of 1.5 is convenient because it represents roughly the middle of the scale of readable densities. The standard film, which will be designated as a density standard, is produced by irradiating a sample of the film used in the film badge with X-rays of the proper quality and in the proper amount to yield a net film density of 1.5 when developed under convenient developing conditions, usually similar to those recommended by the manufacturer of the film. Typical convenient developing conditions are, for example, the use of fresh developer at a developing temperature of 68° F. for times ranging in the neighborhood of from 3 to 10 minutes. The choice of the proper irradiation required to produce density standards can be determined from experience or from curves similar to those in Fig. 3 provided those curves have been made under known, preferably convenient, developing conditions. For example, a density standard for the film of the specific embodiment hereinbefore described can be prepared by irradiating film of the type used in this embodiment with 0.91 roentgen at an effective energy of 68 kilovolts through a shield of the type used for region C. The same standard might be produced by irradiating, for example, the unshielded film with 1 roentgen at about 21 effective kilovolts or 1 roentgen at about 91 effective kilovolts. The net density is defined as the total density minus the fog density. The fog density is measured by the density of a piece of the same film as the density standard film, unexposed and co-developed with the density standard film.

Before the film in a film badge is developed the developing conditions are tested by developing a density standard for the expected time required to produce a density in it of 1.5. Fresh developer and carefully controlled developing techniques should produce the desired film density within rather close limits. Should the observed density be higher or lower than desired, the required density can be produced by developing another identically exposed density standard for a shorter or longer time. Both liquid and powder developers have been used and found to be satisfactory. Experience with developers at different concentrations has shown that as long as the developer has sufficeint strength to develop a density standard to a net density of 1.5 in a reasonable amount of time it can be used satisfactorily. The formula for estimating the time correction to compensate for non-standard developing conditions can be found by experiment and for the film of the specific embodiment hereinbefore described is of the form $$\Delta t(\text{min.}) = 3(1.5 - \text{net density of standard})$$

where 3 is the number of minutes required with a particular fresh developer at 68° F. to produce a net density in the density standard film of 1.5. Any combination of the various factors, such as time, strength of developer, temperature, etc. which will develop a density standard film to a density of $1.5 \pm 0.15$ can be regarded as "standardized developing conditions." The use of the density standard in the method of this invention will be apparent from the following example which also illustrates the procedure to be followed.

EXAMPLE I

A density standard of the hereinbefore described specific embodiment is co-developed with an unexposed control film for the time of 3 minutes expected to develop the standard to a density of 1.5. The net density is found to be 1.75. From the aforementioned formula:

$$\Delta t(\text{min.}) = 3(1.5 - \text{net density of standard}) = 3(1.5 - 1.75) = -.75 \text{ minute}$$

The corrected developing time therefore $= 3 - .75$ minute $= 2.25$ minutes. Therefore, "standardized developing conditions" for this particular developer would include a development time of 2.25 minutes. A density standard developed for the corrected developing time should read approximately 1.50. However should another density standard read, for example, 1.35 even though developed for the corrected time of 2.25 minutes, all films developed for this time will read low and their densities should be multiplied by the ratio of $$\frac{1.5}{1.35}$$

in order to read correctly. Similarly, a density standard reading 1.60 will indicate that film developed under this condition will read high and must be multiplied by the ratio $$\frac{1.5}{1.6}$$

This constitutes compensation for actual deviation from calculated, supposedly correct "standardized developing conditions."

The film from a film badge exposed to certain unknown radiation is developed according to the corrected developing time of 2.25 minutes together with a density standard and a control film and the following readings for the different regions and for the density standard and control films are observed:

|  | A | B | C | D | S |
|---|---|---|---|---|---|
| Total | 2.93 | 2.74 | 1.79 | 1.01 | 1.60 |
| Fog Density of Control | .20 | .20 | .20 | .20 | .20 |
| Net | 2.63 | 2.54 | 1.59 | .81 | 1.40 |

From the following table, constructed from the curves of Fig. 3, the effective energy and the corresponding multiplying factor (M. F.) can be determined for any particular film density ratio.

Table I

FILM DENSITY RATIOS, EFFECTIVE ENERGY AND MULTIPLYING FACTORS

| A/B | Multiplying Factors for B | B/C | Multiplying Factors for C | C/D | Effective Kilovolts |
|-----|---------------------------|------|---------------------------|------|---------------------|
| 1.60 | 2.00 | | | | 17.0 |
| 1.43 | 1.43 | | | | 18.0 |
| 1.40 | 1.17 | | | | 19.0 |
| 1.36 | 1.0 | | | | 20.0 |
| 1.27 | .85 | | | | 21.0 |
| 1.26 | .77 | | | | 22.0 |
| 1.25 | .71 | | | | 23.0 |
| 1.22 | .64 | | | | 24.0 |
| 1.19 | .61 | 5.60 | 3.33 | | 25.0 |
| 1.18 | .56 | 4.45 | 2.50 | | 26.0 |
| 1.15 | .53 | 3.96 | 2.08 | | 27.0 |
| | | 3.54 | 1.79 | | 28.0 |
| | | 3.16 | 1.52 | | 29.0 |
| | | 2.94 | 1.43 | 3.60 | 30.0 |
| | | 2.82 | 1.25 | 3.54 | 31.0 |
| | | 2.62 | 1.16 | 3.30 | 32.0 |
| | | 2.50 | 1.09 | 3.07 | 33.0 |
| | | 2.36 | 1.00 | 2.94 | 34.0 |
| | | 2.35 | .96 | 2.90 | 35.0 |
| | | 2.24 | .91 | 2.76 | 36.0 |
| | | 2.16 | .88 | 2.60 | 37.0 |
| | | 2.08 | .83 | 2.56 | 38.0 |
| | | 2.04 | .81 | 2.48 | 39.0 |
| | | 2.00 | .78 | 2.38 | 40.0 |
| | | 1.78 | .69 | 2.15 | 45 |
| | | 1.60 | .63 | 1.95 | 50 |
| | | 1.43 | .62 | 1.83 | 55 |
| | | 1.32 | .56 | 1.74 | 60 |
| | | 1.25 | .57 | 1.63 | 65 |
| | | 1.23 | .60 | 1.53 | 70 |
| | | 1.20 | .63 | 1.43 | 75 |
| | | | .66 | 1.37 | 80 |
| | | | .70 | 1.30 | 85 |
| | | | .75 | 1.25 | 90 |
| | | | .79 | 1.21 | 95 |
| | | | .85 | 1.18 | 100 |
| | | | .96 | 1.16 | 110 |
| | | | 1.11 | 1.13 | 120 |
| | | | 1.28 | 1.12 | 130 |

From the recorded net densities in this example $$\frac{D_B}{D_C} = \frac{2.54}{1.59} = 1.6$$

$$\frac{D_C}{D_D} = \frac{1.59}{.81} = 1.96$$

Because the density ratio of $$\frac{\text{shield A}}{\text{shield B}}$$

is in the neighborhood where its value is changing very slowly it should not be used. From Table I the energy corresponding to either of the other ratios is found to be about 50 effective kilovolts and the multiplying factor for region C corresponding to these ratios and this effective kilovoltage is found to be .63. Then the Roentgen dose received equals $$1.59 \times .63 = 1.00$$

However, the density standard was developed to a density of 1.4 rather than 1.5 which indicates that all radiation quantities will read low and must be multiplied by the quotient $$\frac{1.5}{1.4}$$

Thus the corrected Roentgen dose =

$$1.00 \times \frac{1.5}{1.4} = 1.07 \text{ roentgens.}$$

From the foregoing example it is apparent that in general the density ratio between any two regions can be used to determine the radiation dose and will yield the same correct answer. It is necessary only to avoid the use of those regions where the density is unreadable and where the ratio is changing slowly and ceases to be accurate.

Obviously many modifications and variations of the present invention are possible in the light of the above teachings. It is therefore to be understood that within the scope of the appended claims the invention can be practiced otherwise than as specifically described.

The inventon described herein may be manufactured and used by or for the Government of the United States of America for governmental purposes without the payment of any royalties thereon or therefor.

What is claimed is:

1. A radiation meter of the class described comprising a film holder, a film contained in said holder and echelon type filter means, including an open window region, arranged to filter the radiations reaching said film, the absorption characteristics of said filter means and the energy response characteristics of said film being so correlated that the densities of at least some one pair of the regions of said film are readable and their ratio uniquely determines the effective energy of the radiation at each point within the range of energies and dosages which it is desired to measure, said filter means including a second region comprising a sheet of aluminum having a thickness of the order of about 0.3 mm. to about 0.5 mm., a third region comprising a sheet of aluminum of said thickness and a sheet of copper having a thickness of the order of about 0.1 mm. to about 0.2 mm., and a fourth region comprising a sheet of aluminum of said thickness and a sheet of copper having a thickness of the order of about 0.6 mm. to about 2 mm.

2. A radiation meter of the class described comprising a film holder, a film contained in said holder, and echelon type filter means arranged to filter radiations reaching said film comprising an open window region, a second region having radiation absorption characteristics substantially equivalent to a sheet of aluminum having a thickness of the order of about 0.3 mm. to about 0.5 mm., a third region having radiation absorption characteristics substantially equivalent to a sheet of aluminum of said thickness combined with a sheet of copper having a thickness of the order of about 0.1 mm. to about 0.2 mm., and a fourth region having radiation absorption characteristics equivalent to a sheet of aluminum of said thickness combined with a sheet of copper having a thickness of the order of about 0.6 mm. to about 2 mm.

3. A radiation meter comprising a film holder, a film contained in said holder, and filter means arranged to filter radiations reaching said film, said filter means comprising an open window region, a region providing filtration equivalent to a sheet of aluminum having a thickness of the order of about 0.3 mm. to about 0.5 mm., and at least one of the following regions: a region providing filtration equivalent to that of a sheet of aluminum of said thickness combined with a sheet of copper having a thickness of the order of about 0.1 mm. to about 0.2 mm., and a region providing filtration equivalent to that of a sheet of aluminum of said thickness combined with a sheet of copper having thickness of the order of about 0.6 mm. to about 2 mm.

4. A radiation meter comprising a film holder, a film contained in said holder, and filter means arranged to filter radiations reaching said film, said filter means comprising a region providing filtration equivalent to a sheet of aluminum having a thickness of the order of about 0.3 mm. to about 0.5 mm. combined with a sheet of copper having a thickness of the order of about 0.1 mm. to about 0.2 mm., and at least one of the following regions: an open window region, a region providing filtration equivalent to a sheet of aluminum of said thickness, and a region providing filtration equivalent to a sheet of aluminum of said thickness combined with a sheet of copper having a thickness of the order of about 0.6 mm. to about 2 mm.

EUGENE TOCHILIN.
RICHARD H. DAVIS.

REFERENCES CITED

The following references are of record in the file of this patent:

UNITED STATES PATENTS

| Number | Name | Date |
| --- | --- | --- |
| 2,387,887 | Dimsdale et al. | Oct. 30, 1945 |
| 2,483,991 | Wollan et al. | Oct. 4, 1949 |
| 2,496,218 | Kieffer | Jan. 31, 1950 |